US005330316A

United States Patent [19]

Buckman et al.

[11] Patent Number: 5,330,316

[45] Date of Patent: Jul. 19, 1994

[54] SHEET HANDLING APPARATUS AND METHOD

[75] Inventors: Symon P. A. Buckman; David L. Patterson, both of Dundee, Scotland

[73] Assignee: NCR Corporation, Dayton, Ohio

[21] Appl. No.: 831,590

[22] Filed: Feb. 5, 1992

[30] Foreign Application Priority Data

Mar. 12, 1991 [GB] United Kingdom .............. 9105151.6

[51] Int. Cl.[5] .............................................. B65G 57/11

[52] U.S. Cl. .................................. 414/790.2; 271/3.1; 271/220

[58] Field of Search ............... 271/198, 220, 221, 222, 271/3.1, 118, 273; 414/786, 790.2, 790.7, 794.4; 902/36

[56] References Cited

U.S. PATENT DOCUMENTS

| | | | |
|---|---|---|---|
| 4,320,854 | 3/1982 | Hirose | 221/12 |
| 4,462,509 | 7/1984 | Adelberger | 271/3.1 X |
| 4,616,817 | 10/1986 | Yamauchi et al. | 271/3.1 X |
| 4,721,229 | 1/1988 | Dempf et al. | 271/220 X |
| 4,750,853 | 6/1988 | Van Soest et al. | 271/220 X |
| 5,106,077 | 4/1992 | Kawaguchi et al. | 271/273 X |

FOREIGN PATENT DOCUMENTS

| | | |
|---|---|---|
| 308060 | 3/1989 | European Pat. Off. . |
| 357818 | 3/1990 | European Pat. Off. . |
| 2076376 | 12/1981 | United Kingdom . |
| 2135977 | 9/1984 | United Kingdom . |

OTHER PUBLICATIONS

IBM Technical Disclosure Bulletin, vol. 27, No. 1B, Jun. 1984, "Currency Escrow with Joggle Stacker", F. D. Parnell and M. E. Stanhope.

*Primary Examiner*—Michael S. Huppert
*Assistant Examiner*—Janice Krizek
*Attorney, Agent, or Firm*—Elmer Wargo

[57] ABSTRACT

A sheet handling apparatus for accumulating a plurality of sheets into a stack (18) and for feeding the stack (18) to an exit location includes first feeding belts (30) for feeding sheets along a feed path to a stacking area (43) at which there is provided a support plate (44) positioned lower than the feed path. A plurality of rubber strips (50) are arranged to urge each of the sheets leaving the feed path towards the support plate (44) whereby the stack (18) is formed supported by the support plate (44) with the rubber strips (50) engaging the top sheet of the stack (18). Part of the stack (18) projects beyond an edge of the support plate (44), and further feeding belts (114, 68) are adapted to grip this part of the stack ( 18 ) and thereafter feed the stack (18) to the exit location. The apparatus (10) may be used in an ATM for stacking printed sheets making up a bank account statement into a stack and for feeding the stack to a user of the ATM.

10 Claims, 6 Drawing Sheets

SHEET HANDLING APPARATUS AND METHOD

BACKGROUND OF THE INVENTION AND METHOD

This invention relates to a method of handling sheets and to a sheet handling apparatus. The invention has application, for example, to a self-service financial terminal or automated teller machine (ATM) of the kind having the facility of providing a bank statement in response to a request made by a user of the terminal.

In operation of a known financial terminal of the kind specified, a user inserts a customer identifying card into the machine and then enters certain data (including a personal identification number and the type of transaction required) upon one or more keyboards included in a user console of the machine. If the requested transaction is the provision of a bank statement, the machine will cause a statement to be printed on a paper sheet and will cause the sheet to be fed to an exit port in the user console for collection by the user.

A problem experienced with the known financial terminal referred to above is that if a large amount of information is to be included in a requested statement then it may not be possible to set out all such information on a single sheet. In that case, it is necessary for the statement to be set out on two or more separate sheets which are fed in succession to the exit port and which are collected in succession by the user. From the user's point of view, it would be more convenient for two or more statement sheets to be presented at the exit port in the form of a stack, in a manner similar to that in which a cash dispensing mechanism of an ATM delivers a plurality of bank notes for collection by a user.

A known stacking and feeding mechanism for currency notes includes a rotating stacking wheel incorporating a series of curved tines. In operation, currency notes are fed one by one to the stacking wheel, each note entering between adjacent tines and being carried partly around the axis of the stacking wheel before being stripped from the wheel by stripper arms and stacked on transport means formed by endless belts. After the stack has been formed, the transport means feed the stack to an exit location. The stacking wheel of this known mechanism operates at high speed, and the mechanism is of somewhat complicated construction.

SUMMARY OF THE INVENTION

It is an object of the present invention to provide a sheet handling apparatus for accumulating a plurality of sheets into a stack and for feeding the stack to an exit location,. which apparatus is of simple construction.

According to the invention there is provided a sheet handling apparatus for accumulating a plurality of sheets into a stack and for feeding said stack to an exit location, characterized by first feeding means for feeding said sheets one by one along a first feed path to a stacking area at which there is provided a support member positioned lower than the output end of said first feed path, resiliently deformable means arranged to engage and urge each of said sheets leaving said first feed path towards said support member whereby said stack is formed supported by said support member with said resiliently deformable means engaging the uppermost sheet of said stack, said support member being dimensioned so that an edge portion of said stack projects beyond an edge of said support member, and second feeding means including first and second cooperating parts, said first cooperating part being movable between active and inactive positions whereby when said first cooperating part is moved to said active position said edge portion of said stack is gripped between said first and second cooperating parts, said second feeding means being operable to feed said stack, when gripped by said first and second cooperating parts, along a second feed path from said stacking area to said exit location.

In another aspect of this invention, there is provided a method of providing a bank statement via an ATM in response to a request of said ATM comprising the steps of:

(a) printing and separating said bank statement into a plurality of sheets;

(b) accumulating said plurality of sheets into a stack; and (c) feeding said stack through an exit slot in said ATM to be grasped by a user of said ATM.

BRIEF DESCRIPTION OF THE DRAWING

One preferred embodiment of the invention will now be described by way of example with reference to the accompanying drawing, in which.

DETAILED DESCRIPTION OF THE INVENTION

Figure 1:
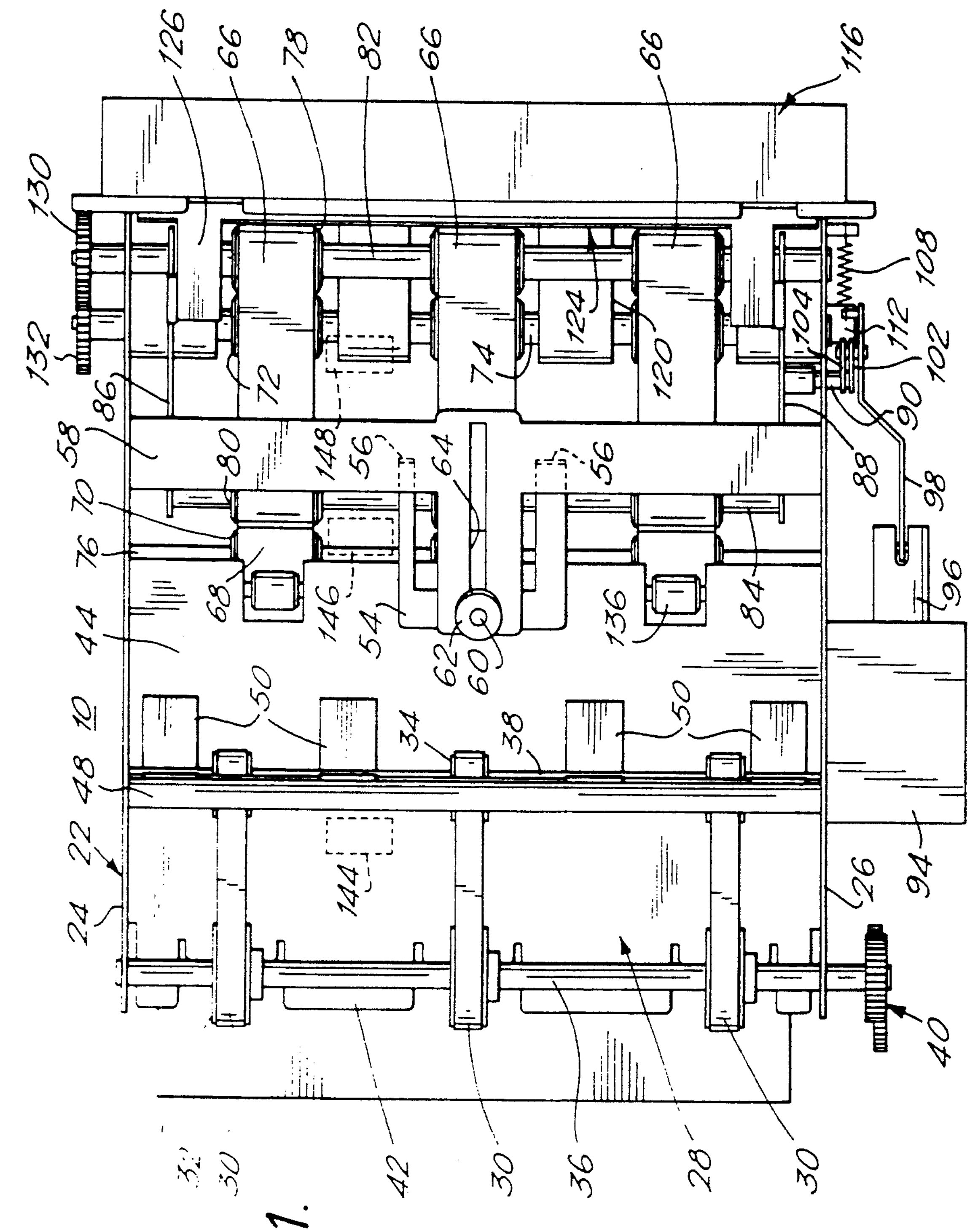
FIG. 1 is a plan view of an apparatus in accordance with the invention for stacking and feeding a plurality of sheets, constituting a bank account statement, to an exit location.
Figure 2:
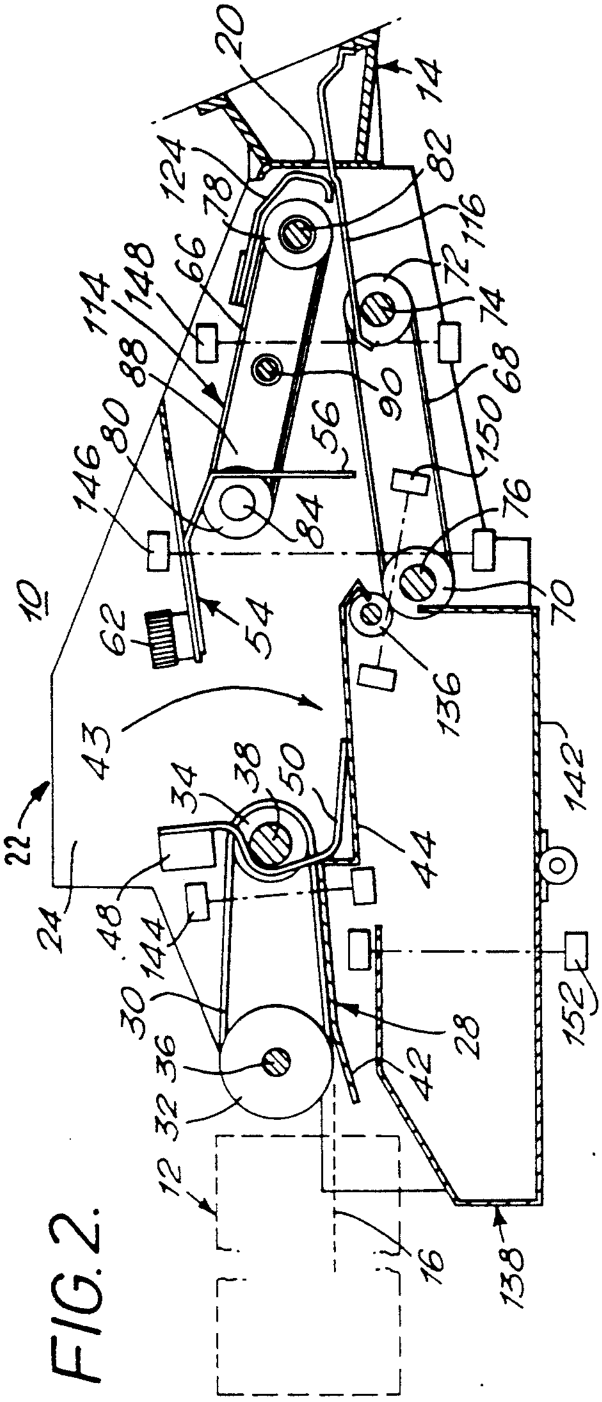
FIG. 2 is a side elevational view, shown partly in section, of the apparatus of FIG. 1, the elevational view being taken from the underside of FIG. 1, with parts of the apparatus of FIG. 1, including one of the side walls, being omitted for the sake of clarity.

Referring to FIGS. 1 and 2, the sheet stacking and feeding apparatus 10 shown therein forms part of an ATM which provides various banking services as may be requested by customers, including the provision of printed bank account statements. The ATM includes a sheet printing and separating section 12 (FIG. 2) in which, in response to a request for a bank account statement entered by a bank customer on keyboards (not shown) included in a user console 14 (FIG. 2) of the ATM, account information is printed on a continuous form (not shown) which is separable into individual sheets. When the printing and sheet separation operations have been completed, one or more printed sheets making up an account statement are fed from the section 12 by means not shown along a feed path 16 to the apparatus 10. Hereinafter, it will be assumed that a requested account statement is fed from the section 12 by means not shown along a feed path 16 to the apparatus 10. Hereinafter, it will be assumed that a requested account statement is made up of a plurality of printed sheets which are formed by the apparatus 10 into a stack 18 (see FIGS. 4 to 6) before being fed by the apparatus 10 to an exit slot 20 situated at the user console 14.

Figure 7:
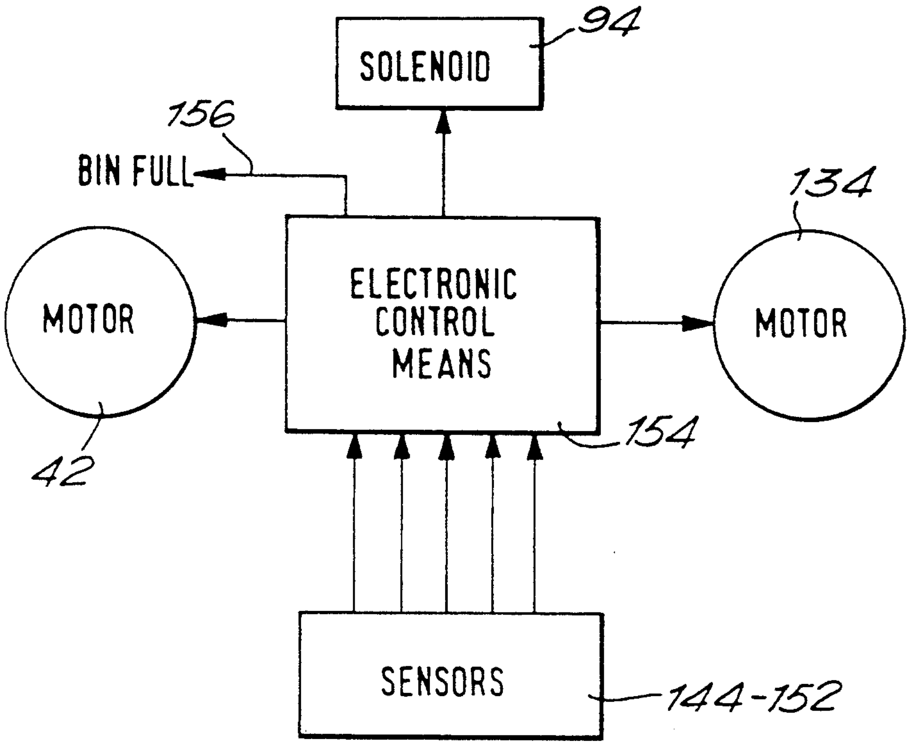
FIG. 7 is a schematic block diagram illustrating the electrical interconnections of parts of the apparatus.

The apparatus 10 includes a supporting framework 22 having side walls 24 and 26. Extending between the side walls 24 and 26 at the rear end of the apparatus 10 (the left hand end with reference to FIGS. 1 and 2) is a smooth guide plate 28 which is mounted beneath, and is in cooperative relationship with respect to, a set of three endless friction belts 30, each belt 30 passing around a respective rear pulley 32 and a respective front pulley 34. The rear pulleys 32 are secured on a drive shaft 36 which extends between, and is rotatably mounted with respect to, the side walls 24 and 26, and the front pulleys 34 are rotatably mounted on a shaft 38 extending between the side walls 24 and 26. The drive shaft 36 is driven by a gear system 40 (FIG. 1) which is connected via transmission means (not shown) to an electric motor 42 (FIG. 7). The rear end of the guide plate 28 is provided with downwardly sloping portions 42 (FIG. 2) which form an entry throat between the guide plate 28 and the belts 30 into which sheets from the printing and separating section 12 are fed one by one in operation. The belts 30 feed sheets, received from the section 12, one by one to a stacking area 43 along a feed path between the belts 30 and the upper surface of the guide plate 28. The sheets are rectangular in shape and are fed along the last-mentioned feed path with their shorter dimension parallel to the direction of movement along this feed path.

Figure 4:
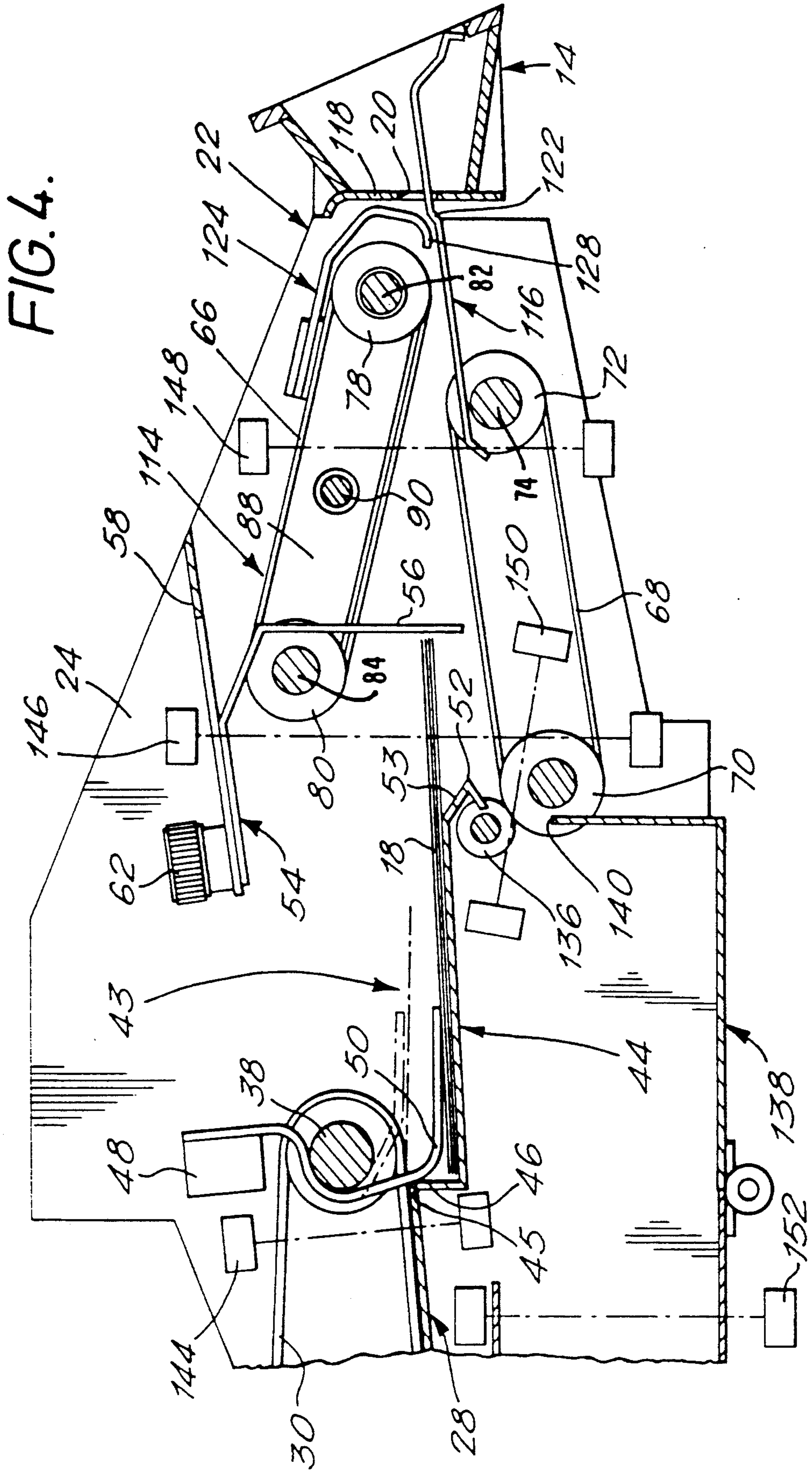
FIG. 4 is an enlarged view of part of FIG. 2, this view corresponding to a sheet stacking operation of the apparatus of FIGS. 1 to 3.
Figure 5:
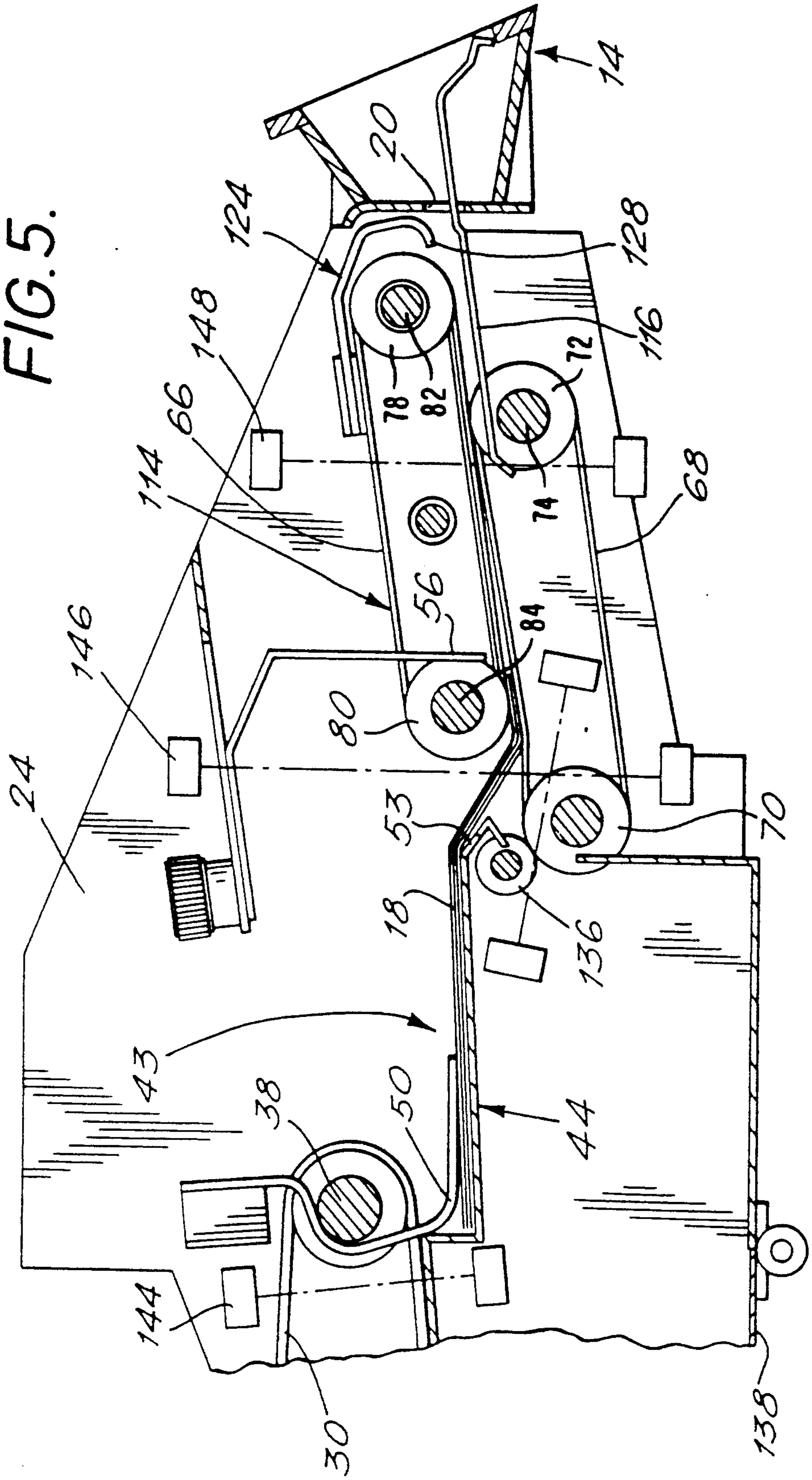
FIG. 5 is a view similar to FIG. 4 but corresponding to an initial stage of a stack feeding operation of the apparatus.
Figure 6:
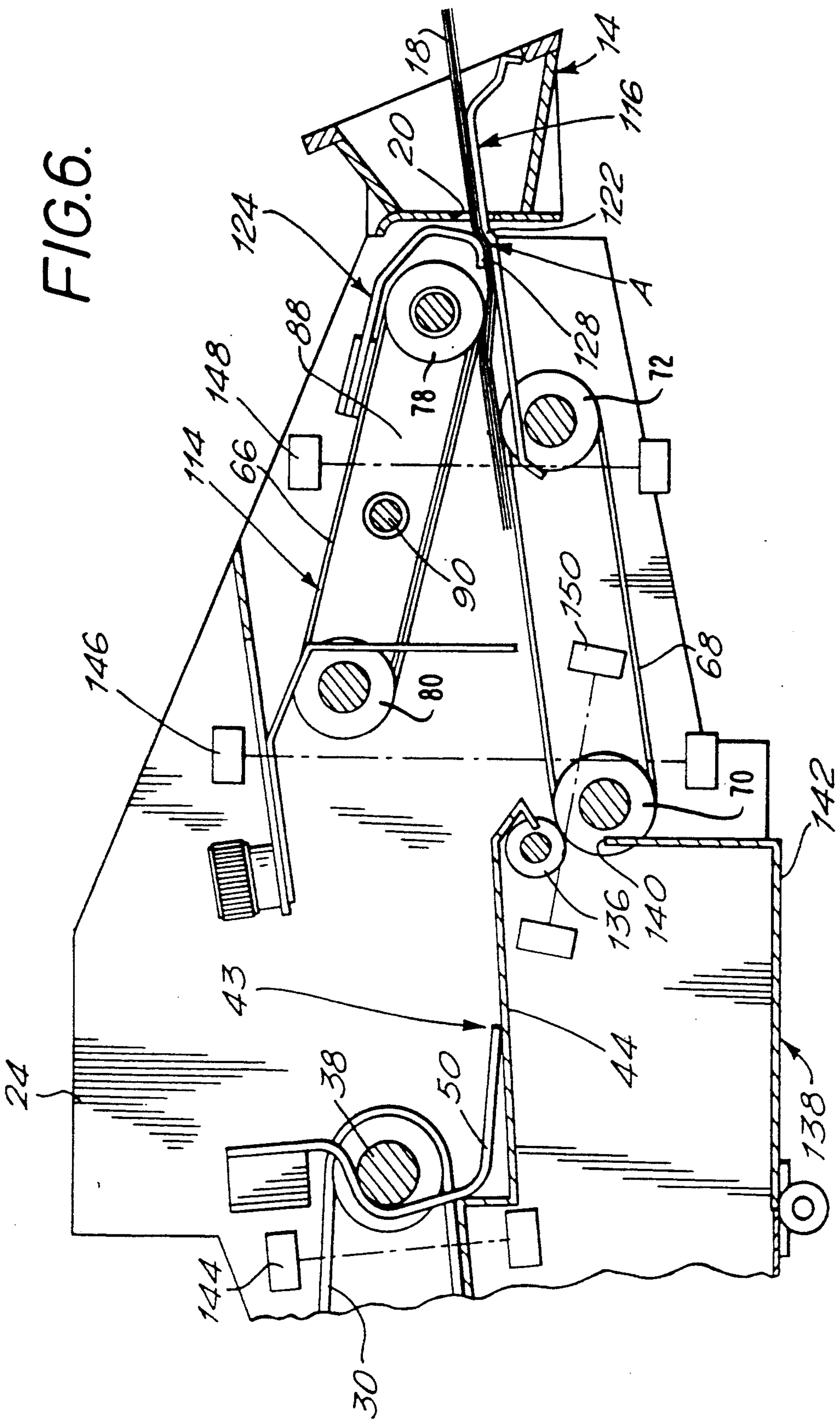
FIG. 6 is a view similar to FIGS. 4 and 5 but corresponding to an initial stage of a stack feeding operation.

Referring additionally to FIGS. 4 to 6, at the stacking area 43 there is provided a stacking support plate 44 which is generally parallel to the guide plate 28. The support plate 44 is positioned lower than the output end of the last-mentioned feed path, this end corresponding to the front edge 45 of the guide plate 28. The rear edge of the support plate 44 (the left hand edge with reference to FIGS. 2, 4, 5, and 6) is provided with an upwardly projecting lip 46 which abuts against the front edge 45 of the guide plate 28. A bar 48 extends between the side walls 24 and 26 above the shaft 38 and the belts 30. Ends of four resiliently deformable rubber strips 50 are secured to the bar 48, the strips 50 being interspersed with respect to the belts 30 as shown in FIG. 1. The strips 50 extend downwardly from the bar 48 with the free, lower ends of the strips 50 bearing resiliently against the upper surface of the support plate 44, as shown in FIG. 2, in the absence of any sheet on the plate 44. Also, as shown in FIGS. 2, 4, 5, and 6 each strip 50 passes rearwardly of, and partly around the circumference of, the shaft 38. In the present embodiment, the strips 50 are about 1 millimeter thick and are of solid antistatic Neoprene rubber having a Shore "D" hardness of 70.

As will be described in more detail later, in the course of a cycle of operation of the apparatus 10, a stack of sheets 18 is accumulated on, and supported by, the support plate 44. The plate 44 is so dimensioned that, as shown in FIG. 4, the front edge portion of the stack of sheets 18 extends beyond the front edge 52 of the plate 44, the edge 52 being connected to the main supporting portion of the plate 44 by an angled portion 53. The apparatus 10 includes a stop member 54 which has two downwardly projecting arms 56 and which is adjustably attached to a bracket 58 secured to the framework 22. Again as shown in FIG. 4, the stop member 54 is positioned so that the free, lower ends of the stop arms 56 are located below, and a short distance in front of, the leading edge of the stack of sheets 18 supported by the support plate 44. Thus, the arms 56 extend transversely to the direction of movement of the sheets along the feed path between the belts 30 and the guide plate 28, the arms 56 serving to define the front edge of the stacking area 43. It should be understood that the spacing of the stop arms 56 from the front edge 45 of the guide plate 28 can be adjusted so that the stacking area 43 can accommodate different sizes of sheets as regards their shorter dimension. Such adjustment is effected by means of a threaded stud 60 (FIG. 1) secured to the stop member 4 and an associated nut 62, the stud 60 being slidable along a slot 64 in the bracket 58 following loosening of the nut 62.

Upper and lower sets of three endless belts 66 and 68 serve to feed the stack of sheets 18 from the stacking area 43 to an exit location for the stack 18 in a manner to be described later, FIG. 6 showing the stack 18 positioned at the exit location. Each of the lower belts 68 passes around a respective rear pulley 70 and a respective front pulley 72. The front pulleys 72 are secured on a drive shaft 74 which extends between, and is rotatably mounted with respect to, the side walls 24 and 26, and the rear pulleys 70 are rotatably mounted on a shaft 76 extending between the side walls 24 and 26. The rear pulleys 70 are positioned a short distance below the front edge 52 of the support plate 44. Each of the upper belts 66 passes around a respective front pulley 78 and a respective rear pulley 80, the front pulleys 78 being secured on a drive shaft 82 which extends between, and is rotatably mounted with respect to, the side walls 24 and 26. The rear pulleys 80 are rotatably mounted on a shaft 84 which extends between, and is carried by, corresponding ends of a pair of arms 86 and 88. The arms 86 and 88 are respectively spaced short distances inwardly of the side frames 24 and 26, and those ends of the arms 86 and 88 remote from the shaft 84 are mounted on the drive shaft 82 so that the arms 86 and 88 are pivotable about the axis of the shaft 82.

Figure 3:
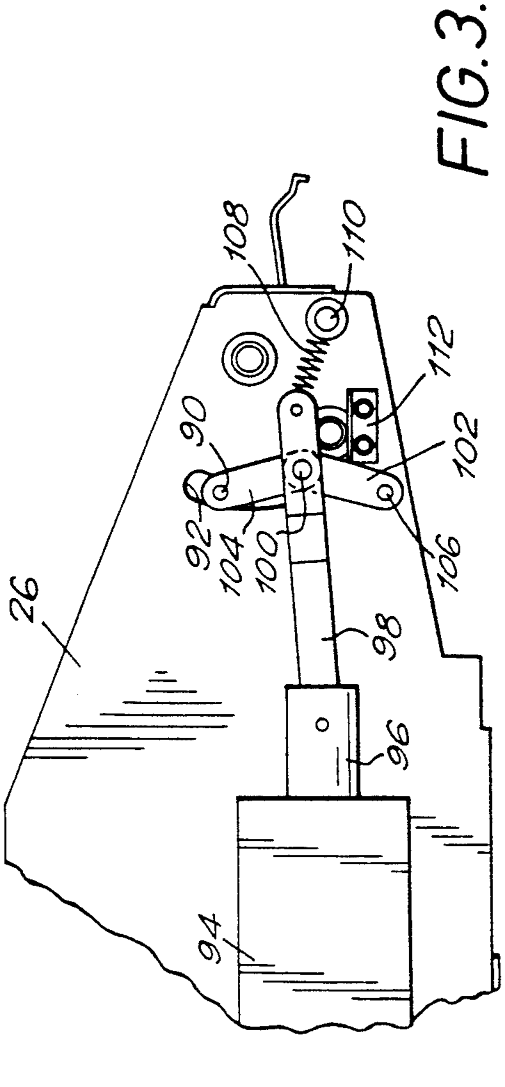
FIG. 3 is a side elevational view of part of the apparatus of FIG. 1, showing some features not shown in FIG. 2.

Referring now also to FIG. 3, a stud 90, secured to the arm 88 (FIG. 2), passes through an arcuate slot 92 formed in the side wall 26. A solenoid 94 having a horizontally extending armature 96 is mounted on the outer face of the side wall 26. An arm 98 is pivotably connected at one end to the armature 96, the arm 98 carrying a stud 100 on which are pivotably mounted one end of a downwardly extending link member 102 and one end of an upwardly extending link member 104. The lower end of the link member 102 is pivotably mounted on a stud 106 secured to the side wall 26, and the upper end of the link member 104 is pivotably connected to that end of the stud 90 projecting outside the side wall 26. A tension spring 108 is connected between that end of the arm 98 remote from the armature 96 and a further stud 110 secured to the side wall 26. When the solenoid 94 is in a deactivated condition, the spring 108 urges the arm 98 towards the right (with reference to FIG. 3) with the link member 102 engaging a stop member 112 secured to the side wall 26 and with the axis of the stud 100 being positioned to the right of an imaginary line joining the axes of the studs 90 and 106, as shown in FIG. 3.

When the solenoid 94 is in a deactivated condition, the arms 86 and 88, supported by the link members 102 and 104 via the stud 90, hold the belts 66 out of cooperative engagement with the belts 68, as shown in FIGS. 2, 4, and 6. When the solenoid 94 is energized, the arm 98 is pulled to the left (with reference to FIG. 3), this movement of the arm 98 first of all bringing about a slight upward movement of the stud 90 as the link members 102, 104 straighten relative to each other. Once the axis of the stud 100 has moved past and to the left of the imaginery line joining the studs 106 and 90, then continued leftward movement of the arm 98 causes the stud 90 to move downwardly along the slot 92 which in turn causes the assembly 114 of the belts 66, arms 86 and 88, and pulleys 80 to pivot in a counterclockwise direction (with reference to FIG. 2) about the axis of the shaft 82. This pivotal movement of the assembly 114 continues until the belts 66 come into cooperative relationship with respect to the belts 68 as shown in FIG. 5. When the belts 66 and 68 are in cooperative relationship, the pulleys 80 are offset forwardly of the pulleys 70, and a slight deformation of the belts 68 is brought about by virtue of the pressure exerted thereon by the assembly 114.

A guide plate 116 extends from the front of the user console 14 through a front end portion 118 of the framework 22 in which the exit slot 20 is formed to a position in the region of the pulleys 72, the plate 116 being provided with cutaway areas 120 in order to accommodate parts of the pulleys 72 and belts 68. The guide plate 116 includes a stepped portion 122 positioned a short distance inside the front end portion 118 of the framework 22. A shutter 124 is secured to the arms 86 and 88 by means of connecting portions 126. As best shown in FIGS. 4 to 6, the free end of the shutter 124 is formed as an inwardly bent portion 128. When the belt assembly 114 is in the inactive position shown in FIGS. 2, 4, and 6, which corresponds to the solenoid 94 being in a deactivated condition, the shutter 124 is positioned immediately behind the exit slot 20, with the inwardly bent portion 128 positioned a short distance above the plate 116 close to the stepped portion 122. By virtue of such positioning of the bent portion 128 close to the stepped portion 122, when a stack of sheets 128 is projecting through the exit slot 20 as shown in FIG. 6, a step is formed in the stack 18 in the region of the arrow A in FIG. 6. It should be understood that, by virtue of the spacing between the bent portion 128 and the guide plate 116, the stack of sheets 18 is only loosely held by the shutter 124, but that because of the step formed in the stack of sheets 18 the stack is held by the shutter 124, against inadvertent displacement of the stack 18 due to wind, etc. (in the case where the user console 14 is situated at an exposed, outside location).

The drive shafts 82 and 74 for the belts 66 and 68 are respectively driven by gear wheels 130 and 132 (FIG. 1) which are connected via transmission means (not shown) to a reversible electric motor 134 (FIG. 7). When the solenoid 94 is energized, with a stack of sheets 18 being supported on the support plate 44 as shown in FIG. 4, the belt assembly 114 is pivoted in a counterclockwise direction so as to cause the leading edge portion of the stack 18 to be gripped between the belts 66 and 68 as shown in FIG. 5. Thereafter, energization of the motor 134 in the appropriate direction causes the belts 66 and 68 to feed the stack of sheets 18 along a further feed path to the position shown in FIG. 6 in which the stack 18 can be removed from the user console 14 by a user of the ATM, the leading edge of the stack 18 having been fed through the slot 20 over the guide plate 116. It should be understood that, when the belt assembly 114 is in its active position shown in FIG. 5, the end 128 of the shutter 124 has been lifted substantially clear of the slot 20 so as not to impede the passage of the leading edge of the stack 18 through the slot 20.

Three pinch rolls 136 (FIG. 4) are respectively cooperatively associated with the belts 68 in the vicinity of the pulleys 70, the pinch rolls 136 being positioned immediately beneath the support plate 44 adjacent the front edge 52 thereof. A reject bin 138 for uncollected sheets is located beneath the support plate 44. The bin 138 is provided with an opening 140 immediately beneath the pinch rolls 136. If the user of the ATM fails to remove the stack of sheets 18 from the user console 14, then the motor 134 is operated in the reverse direction so as to cause the belts 66 and 68 to withdraw the stack 18 into the apparatus 10 and feed the stack 18 towards the nip of the pinch rolls 136 and belts 68. After the stack of sheets 18 reaches the rolls 136, the stack 18 is driven by the rolls 136 and the belts 68 through the opening 140 into the reject bin 138. The bin 138 is provided with a hinged portion 142 which can be pivoted downwardly to enable the contents of the bin 138 to be removed.

First optical sensing means 144 sense the passage of printed sheets from the printing and separating section 12 to the stacking area 43, and second optical sensing means 146 sense the passage of a stack of sheets 18 from the stacking area 43 to the collection location shown in FIG. 6. The presence of the stack of sheets 18 at the collection location is sensed by third optical sensing means 148. The feeding of an uncollected stack of sheets 18 into the reject bin 138 is sensed by fourth optical sensing means 150, and the presence of one or more sheets in the bin 138 is sensed by fifth optical sensing means 152 (FIG. 4). The ATM includes electronic control means 154 (FIG. 7) which controls the operation of the printing and separating section 12, the motors 42 and 134 and the solenoid 94, and to which are applied outputs of the sensor means 144 to 152.

A cycle of operation of the apparatus 10 will now be described with additional reference to FIG. 7. Immediately prior to the user of the ATM requesting a bank account statement, the motors 42 and 134 and the solenoid 94 are all in de-energized conditions. The bank statement request is initiated by the user inserting a customer identifying card into a card entry slot (not shown) in the user console 14 and entering appropriate data upon keyboard means (not shown) also included in the user console 14. As a result of the statement request being initiated, the electronic control means 154 activates the motor 42 so as to drive the feed belts 30, and causes the printing and separating section 12 to print and separate a plurality of sheets making up the bank account statement, these sheets being fed one by one along the feed path 16 to the entry throat between the guide plate 28 and the belts 30. Upon reaching the entry throat, each sheet is gripped by the belts 30 and fed thereby over the smooth guide plate 28 towards the stacking area 43. After the leading edge of each sheet reaches the front edge 45 of the guide plate 28, the free ends of the rubber strip so engage the sheet and deflect it towards the upper surface of the support plate 44. Upon the trailing edge of the sheet moving past the front edge 45 of the guide plate 28 and becoming disengaged from the belts 30, the sheet is rapidly decelerated by the strips 50 and urged by the strips 50 flat against the support surface 44 or against an immediately preceding sheet deposited in the stacking area 43. In this connection, it should be understood that the rapid deceleration of each sheet is brought about by virtue of the frictional nature of the strips 50, the coefficient of friction of each of the strips 50 being significantly greater than that of each of the sheets. The engagement of each sheet by the rubber strips 50, and the rapid deceleration of the sheets brought about thereby, ensures that the sheets are accumulated into a neat stack 18 supported by the plate 44, the trailing edges of the sheets being spaced a short distance from the lip 46. The downwardly projecting stop arms 56 limit the forward movement in the stacking area 43 of any sheet not sufficiently decelerated by the rubber strips 50. Thus, the stop arms 56 further help to ensure that the printed sheets making up a requested statement are accumulated in a neat stack 18 in the stacking area 43.

Following the completion of the stacking operation, a stack of sheets 18 has been formed in the stacking area 43 supported by the support plate 44 and with the leading edge of the stack projecting beyond the leading edge 52 of the support plate 44 and positioned beneath the pulleys 80. The sensing means 144 sends signals to the electronic control means 154 indicating the movement of the trailing edge of each sheet past the sensing means 144. On the basis of the amount of information to be included in the requested bank statement, the electronic control means 154 determines how many separate sheets will make up the stack to be collected by the customer. A short time after the trailing edge of the last sheet in the stack has moved past the sensing means 144, this time being sufficient to enable the stacking operation to be completed, the electronic control means 154 deenergizes the motor 42 so as to stop the feed belts 30, and energizes the solenoid 94. As previously explained, energization of the solenoid 94 brings about a pivotal movement of the belt assembly 114 so as to cause the leading edge portion of the stack of sheets 18 to be deflected downwards and gripped between the belts 66 and 68 as shown in FIG. 5. It should be understood that the angled portion 53 of the support 44 facilitates the downward deflection of the leading edge portion of the stack of sheets 18.

A predetermined time after the trailing edge of the last sheet in the stack 18 has moved past the sensing means 144, and following the gripping of the leading edge portion of the stack 18 between the belts 66 and 68, the electronic control means 154 energizes the motor 134 in the appropriate direction so as to cause the belts 66 and 68 to feed the stack 18 towards the user console 14, the stack 18 passing under the lower ends of the stop arms 56. After the leading edge of the stack 18 has moved past the leading end of the belts 68, the leading edge of the stack 18 is guided by the guide plate 116 through the exit slot 20. A predetermined time after the trailing edge of the stack 18 has been sensed by the sensing means 146,, the electronic control means 154 de-energizes the motor 134 so as to stop the feed belts 66 and 68. At the same time, the electronic control means 154 deactivates the solenoid 94. Following deactivation of the solenoid 94, the spring 108 (FIGS. 1 and 3) pulls the arm 98 forward until the link member 102 engages the stop member 112. This forward movement of the arm 98 in turn brings about an upward pivotal movement of the belt assembly 114 to its inactive position, via the link members 102 and 104, the stud 90 and the arms 88, with the stud 90 sliding along the arcuate slot 92 (FIG. 3) in the side wall 26. During the major part of the return movement of the belt assembly 114 to its inactive position, the assembly 114 pivots about the axis of the shaft 82 in a clockwise direction (with reference to FIGS. 2 to 6), but during the final part of the return movement, after the stud 100 has moved past the imaginary line joining the axes of the studs 90 and 106, the assembly 114 moves back slightly in a counterclockwise direction. Following the completion of the return movement of the belt assembly 114 to its inactive position under the action of the spring 108, the stack of sheets 18 is positioned as shown in FIG. 6, with the leading portion of the stack 18 projecting through the exit slot 20 and with the stack 18 loosely held in position by the shutter 124. The stack 18 can now be readily removed from the user console 14 by the user of the ATM. When the belt assembly 114 is in its inactive position, the shutter 124 is positioned in its home position immediately behind the exit slot 20 so as to inhibit the entry of dirt or other foreign matter into the interior of the apparatus 10. It should be understood that, by virtue of the stud 100 being positioned forward of the imaginary line joining the axes of the studs 90 and 106 (like an over-the-center position), it is not possible for a vandal to move the shutter 124 away from its home position by applying an upward force to the end portion 128 of the shutter 124.

The presence of the stack of sheets 18 in the collection location as shown in FIG. 6 is sensed by the optical sensing means 148. If the stack 18 is not removed from the user console 14 within a predetermined period of time, then the electronic control means 154 re-energizes the solenoid 94 so as again to bring the belts 66 into cooperative relationship with respect to the belts 68, and then energizes the motor 134 in the reverse direction so as to cause the belts 66 and 68 together with the pinch rolls 136 and belts 68 to feed the uncollected stack back into the apparatus 10 and into the reject bin 138 via the opening 140. The passage of the uncollected stack into the bin 138 is sensed by the sensing means 50. After the sensing means 150 has sensed the trailing edge of the uncollected stack, the electronic control means 154 de-energizes the motor 134 so as to stop the feed belts 66, 68, and deactivates the solenoid 94 so as to enable the belt assembly 114 to be returned to its inactive position. The sensing means 152 senses whether at least one sheet is present in the bin 138. After the bin 138 has been emptied of its contents, the sensing means 152 senses the first stack of sheets to be deposited in the empty bin 138. Thereafter, the electronic control means 154 maintains a count of how many sheets have been deposited in the bin 138 since it was last emptied. Upon the electronic control means 154 determining that more than a predetermined number of sheets are present in the bin 138, the electronic control means 154 generates a BIN FULL signal on line 156 (FIG. 7), this signal providing an indication that the bin 138 requires emptying and serving to inhibit further operation of the apparatus 10 until such time as the bin 138 is emptied.

It should be understood that the apparatus 10 described above represents a cheap, simple, and effective means for accumulating a plurality of sheets into a stack and for feeding the stack to an exit location.

What is claimed is:

1. A sheet handling apparatus for accumulating a plurality of paper sheets into a stack and for feeding the stack to an exit location, comprising:

first feeding means for feeding said sheets one by one along a first feed path to a stacking area, with said first feed path having an output end;

a stacking area located at said output end;

a support member positioned lower than said output end;

resilient strips having fee ends biased to engage said support member and with said free ends positioned to engage and urge each of said sheets leaving said first feed path towards said support member to form said stack on said support member;

said support member being dimensioned so that an edge portion of said stack projects beyond an edge of said support member;

second feeding means for feeding said stack of sheets along a second feed path from said stacking area to said exit location;

said second feeding means including first and second cooperating parts; and moving means for moving said first cooperating part between active and inactive positions relative to said second cooperating part;

said first cooperating part, when in said active position, being effective to cooperate with said second cooperating part to grip said edge portion of said stack and feed said stack along said second feed path to said exit location.

2. A sheet handling apparatus for accumulating a plurality of sheets into a stack and for feeding the stack to an exit location, comprising:

first feeding means for feeding said sheets one by one along a first feed path to a stacking area, with said first feed path having an output end;

a stacking area located at said output end;

a support member positioned lower than said output end;

resiliently deformable means positioned to engage and urge each of said sheets leaving said first feed path towards said support member to form said stack on said support member;

said support member being dimensioned so that an edge portion of said stack projects beyond an edge of said support member;

second feeding means for feeding said stack of sheets along a second feed path from said stacking area to said exit location;

said second feeding means including first and second cooperating parts; and moving means for moving said first cooperating part between active and inactive positions relative to said second cooperating part;

said first cooperating part, when in said active position, being effective to cooperate with said second cooperating part to grip said edge portion of said stack and feed said stack along said second feed path to said exit location;

said resiliently deformable means comprising a plurality of strips having free ends which are biased to engage said support member.

3. The apparatus as claimed in claim 1 in which said paper sheets in said stack of sheets have a first coefficient of friction and said resilient strips have a coefficient of friction greater than said first coefficient of friction of said paper sheets.

4. The apparatus as claimed in claim 2 in which said plurality of strips is made of rubber.

5. The apparatus as claimed in claim 1 in which said apparatus also includes a stack stop which extends transversely to said first feed path and is spaced from said edge of said support member to enable said edge portion of said stack to extend beyond said edge of said support member.

6. A sheet handling apparatus for accumulating a plurality of sheets into a stack and for feeding the stack to an exit location, comprising:

first feeding means for feeding said sheets one by one along a first feed path to a stacking area, with said first feed path having an output end;

a stacking area located at said output end;

a support member positioned lower than said output end;

resiliently deformable means positioned to engage and urge each of said sheets leaving said first feed path towards said support member to form said stack on said support member;

said support member being dimensioned so that an edge portion of said stack projects beyond an edge of said support member;

second feeding means for feeding said stack of sheets along a second feed path from said stacking area to said exit location;

said second feeding means including first and second cooperating parts; and moving means for moving said first cooperating part between active and inactive positions relative to said second cooperating part;

said first cooperating part, when in said active position, being effective to cooperate with said second cooperating part to grip said edge portion of said stack and feed said stack along said second feed path to said exit location;

said apparatus also including an exit slot located at said exit location through which said edge portion of said stack of sheets passes; and said first cooperating part having a shutter thereon to close said exit slot when said first cooperating part is in said inactive position and to be substantially clear of said exit slot when said first cooperating part is in said active position.

7. The apparatus as claimed in claim 6 in which said shutter is shaped to engage a trailing portion of said stack when said edge portion of said stack passes through said exit slot and said first cooperating part in moved to said inactive position.

8. The apparatus as claimed in claim 7 in which said apparatus includes a guide plate over which said stack passes in being moved through said exit slot;

said guide plate having a step therein to cooperate with said shutter to form a step in said stack when said first cooperating member is moved from said inactive position to said active position.

9. The apparatus as claimed in claim 8 in which said moving means includes:

linkage having an over-the-center position;

spring means for biasing said first cooperating member to said inactive position to position said linkage in said over-the-center position to prevent said first cooperating member from being moved to said active position by the application of force on said shutter; and a solenoid for moving said linkage past said over-the-center position to move said first cooperating member from said inactive position to said active position.

10. The apparatus as claimed in claim 9 in which said apparatus also includes:

means to determine whether said stack remains at said exit slot for a predetermined period of time;

control means for controlling the operation of said first and second cooperating members to withdraw said stack from said exit slot when said predetermined period of time is reached and to feed said stack to a receptacle area within said apparatus.

* * * * *

UNITED STATES PATENT AND TRADEMARK OFFICE

CERTIFICATE OF CORRECTION

PATENT NO. : 5,330,316

DATED : July 19, 1994

INVENTOR(S) : Symon P.A. Buckman et al.

It is certified that error appears in the above-indentified patent and that said Letters Patent is hereby corrected as shown below:

Column 9, line 7, "fee" should be --free--.

Signed and Sealed this

Twenty-eight Day of February, 1995

Attest:

Bruce Lehman

BRUCE LEHMAN

*Attesting Officer*

*Commissioner of Patents and Trademarks*